Sept. 28, 1954   R. R. BISHOP ET AL   2,690,334
LEAF SPRING FOR VEHICLES
Filed Nov. 25, 1952

Inventors
Roland Ranson Bishop &
Maurice Olley
By
Willito, Helmig & Baillio
Attorneys Patented Sept. 28, 1954

2,690,334

UNITED STATES PATENT OFFICE 2,690,334

LEAF SPRING FOR VEHICLES

Roland R. Bishop, Kimpton, England, and Maurice Olley, Detroit, Mich., assignors to General Motors Corporation, Detroit, Mich., a corporation of Delaware Application November 25, 1952, Serial No. 322,454

Claims priority, application Great Britain December 24, 1951

3 Claims. (Cl. 267—44)

This invention relates to leaf springs for vehicles, both road and rail, the axles of which are subject to torque due to braking and acceleration.

The object of the invention is to limit the distortion of the springs by such torque: the springs tend to "wind-up" or twist about a transverse axis such that one half of the spring is upwardly and the other half downwardly bowed.

This object is achieved by associating the spring assembly with a stop plate adapted to be contacted by the adjacent spring leaf after a predetermined degree of wind-up.

A stop plate can be provided for braking or acceleration or both: that is to say a plate can be fitted adjacent either the rear or the front half of the spring or adjacent each half.

The stop plate is preferably positioned adjacent the top spring leaf and is so curved that that leaf conforms to its shape when the latter is strained to the predetermined limit position.

The plate is preferably attached at one end to one of the spring eyes and at the other end to a part, such as the clamp bolt spacer, of the axle assembly.

The scope of the invention is defined by the appended claims; and how it can be carried into effect is hereinafter particularly described with reference to the accompanying drawings in which:

Figure 1:
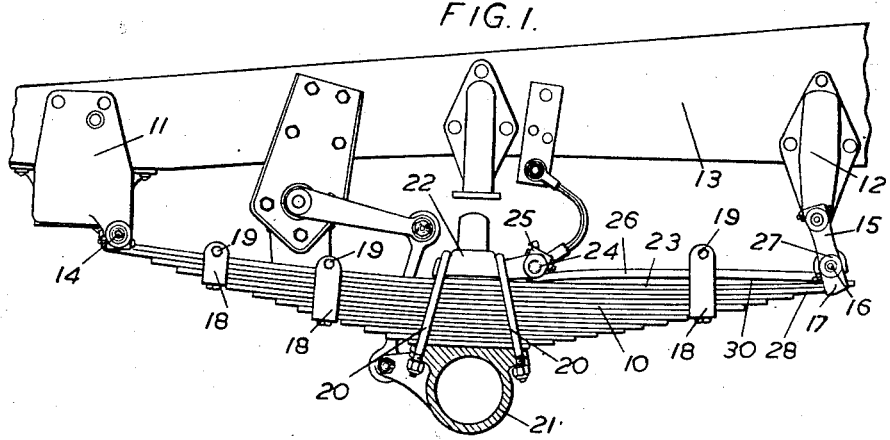
Fig. 1 is a side elevation of a vehicle spring assembly according to the invention.

In Fig. 1 is shown a multi-leaf spring 10 supported by brackets 11 and 12 from the front end of a longitudinal frame member 13 of a vehicle (not shown). The spring 10 is fixed to the bracket 11 by spring-pin 14 and to bracket 12 by a shackle 15 and a spring-pin 16. The shackle 15 has extended side links 17 to prevent lateral displacement of the adjacent ends of the spring 10, leaves of which are held together by U-shaped clamps 18 and pins 19.

On the lower side of the spring 10 is an axle block 21 supported by U-bolts 20 which are separated by a U-bolt spacer 22 on the upper leaf 23. The U-bolt spacer 22 carries a transverse pin 24 which passes through an eye 25 formed at one end of a stop member of plate 26, at the other end of which is a similar eye 27 engaged by the spring pin 16. The adjacent end of the upper leaf 23 is accordingly flat: it is not attached to the pin 16 but is held between the stop plate and the adjacent leaf. The other details shown in Fig. 1 are not relevant to this invention and are not described.

Figure 2:
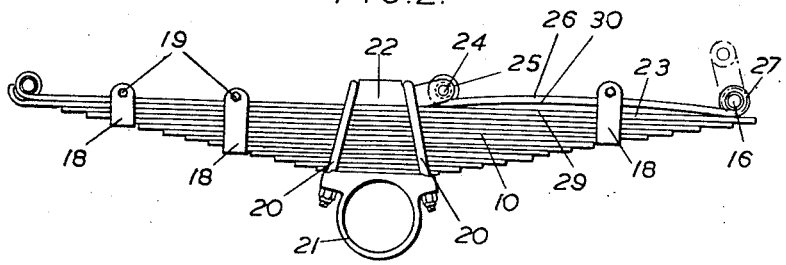
Figs. 2 and 3 show diagrammatically the operation of the assembly the position of the spring in Fig. 2 being the same as in Fig. 1.
Figure 3:
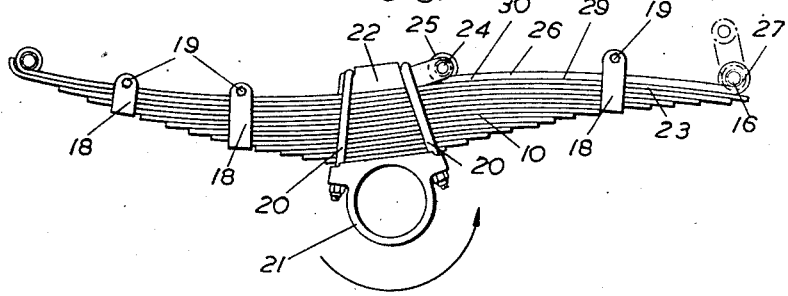

The stop plate 26 is stiff (Figs. 1 and 2) and curved convexly upwardly such that the adjacent upper leaf 23 contacts with its under surface in the maximum bump position. Under braking conditions, the axle is twisted counter-clockwise as shown by the arrow in Fig. 3, and the axle block 21 and the middle part of the spring 10 is likewise turned such that the upper surface 29 of the upper leaf 23 of that half of the spring (the right-hand half in Fig. 3) which is bowed upwardly eventually contacts with the under surface 30 of the stop plate 26 whereupon further twisting and wind-up is prevented.

Figure 4:
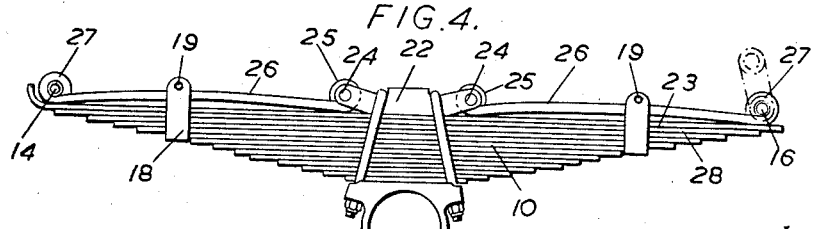
Fig. 4 is a diagrammatic view of another embodiment of the invention.

In the embodiment of Fig. 4 there are two stop plates 26, the eyes 27 on the outer ends thereof being fastened to the normal spring-pins 14 and 16 respectively, and the eyes 25 on the inner ends being fastened by pins 24 on the U-bolt spacer 22. The upper leaf 23 has no eyes and is simply located between the stop plates 26 and the adjacent leaf 28 underneath. One of the stop plates 26 limits the amount of wind-up or twist under brake torque, and the other limits it under acceleration torque.

By the use of two stop plates 13 the amount of twisting or wind-up of the spring is controlled during acceleration and braking both in forward and reverse directions of motion.

We claim:

1. A spring assembly for a vehicle having an axle and a frame, said assembly comprising a leaf spring interposed between said axle and said frame, a clamp member securing the mid-portion of said spring to said axle, pivot members connecting the opposite ends of said spring assembly to said frame, and a stop plate pivotally secured at one end to said clamp member and at the other end to one of said pivot members, said plate being curved to provide substantially uniform contact throughout its length with the upper surface of said spring when the latter is bowed to a predetermined limit.

2. A spring assembly for a vehicle having an axle and a frame, said assembly comprising a plurality of spring leaves interposed between said axle and said frame, a clamp member securing said spring leaves to said axle, pivot members connecting the opposite ends of said spring assembly to said frame, and a stop plate pivotally secured at one end to said clamp member and at the other end to one of said pivot members, the lower surface of said plate being curved to provide substantially uniform contact throughout its length with said upper leaf when the latter is bowed to a predetermined position.

3. A spring assembly for a vehicle having an axle and a frame, said assembly comprising a plurality of spring leaves interposed between said axle and said frame, a clamp member securing said leaves to said axle, pivot members connecting said frame with the opposite ends of said spring assembly, and a pair of stop plates, each of said plates being pivotally secured at one end to said clamp and at the other end to one of sid pivot members, each of said plates being curved to provide substantially uniform contact throughout its length with the adjacent portion of said spring when the latter is bowed to a predetermined position.

References Cited in the file of this patent

UNITED STATES PATENTS

| Number | Name | Date |
|---|---|---|
| 1,155,062 | Heisler | Sept. 28, 1915 |
| 1,618,705 | Hamilton | Feb. 22, 1927 |

FOREIGN PATENTS

| Number | Country | Date |
|---|---|---|
| 193,161 | Great Britain | Feb. 22, 1923 |
| 370,612 | Great Britain | Apr. 14, 1932 |
| 686,743 | Germany | Jan. 15, 1940 |
| 729,324 | Germany | Dec. 14, 1942 |